3,830,832
ANTIMICROBIAL ESTERS OF OCTA-2,3-DIENE-5,7-DIYNE-1-OL

Katsumi Suzuki, Tokyo, Isamu Maeyashiki, Yokohama, Akihiro Fukuda, Yokosuka, Asao Murai, Tokyo, Tsuyoshi Shiio, Kamakura, and Shinji Okumura, Tokyo, Japan, assignors to Ajinomoto Co., Inc., Tokyo, Japan
No Drawing. Filed June 20, 1973, Ser. No. 371,769
Claims priority, application Japan, June 23, 1972, 47/63,600
Int. Cl. C07c 69/14, 69/24
U.S. Cl. 260—488 H        1 Claim

ABSTRACT OF THE DISCLOSURE

Octa - 2,3 - diene-5,7-diyne - 1 - ol has antimicrobial effects, but its esters with acetic and propionic acid are effective in very much smaller amounts.

---

This invention relates to a method of controlling microorganisms, and particularly to octa - 2,3-diene-5,7-diyne-1-ol and derivatives thereof, and to the use of these compounds as antimicrobial agents.

Octa - 2,3 - diene - 5,7-diyne-1-ol was first isolated from the edible basidiomycete *Cortinellus berkeleyanus* Ito and Imai, also known as *Lentinus edodes*, by R. E. Bew (J. Chemical Society 1966 [C] 129–135). The basidiomycete is freely available from the Type Culture Collection in Baarn, Netherlands, and is a staple article of commerce in Japanese markets (Shiitake-Tanekin).

It has now been found that the alcohol has anti-microbial effects, and that its acetic acid and propionic acid esters are similarly effective in concentrations smaller by one or more decimal orders of magnitude. The esters are readily prepared from the alcohol by conventional methods at a pH of less than 7 to avoid decomposition of the alcohol.

*Lentinus edodes* grows readily on aqueous 3% malt extract. Thirty to forty days after inoculation, the culture medium was exhaustively extracted with ether or ethyl acetate, the extract was washed with sodium bicarbonate solution and distributed between water and a 7% solution of benzene in petroleum ether (b.p. 40°–60° C.) by means of a 120 tube Craig countercurrent distribution apparatus. Octa-2,3-diene-5,7-diyne-1-ol having the formula

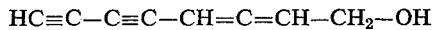

$$HC\equiv C-C\equiv C-CH=C=CH-CH_2-OH$$

was recovered from the fraction containing the compound.

It was readily converted to its esters with acetic and propionic acid by reaction with the acids in the presence of mineral acid, by reaction with acetic or propionic anhydride, and by reaction with acetyl or propionyl chloride in a manner conventional in itself and further illustrated by the following Examples.

EXAMPLE 1

A solution of 30 mg. octa-2,3-diene-5,7-diyne-1-ol in 10 ml. chloroform was mixed with 5 ml. acetic anhydride, and the chloroform was evaporated in a vacuum. 50 ml. toluene was added to the residue and distilled off in a vacuum for removal of acetic acid as an azeotropic mixture with the toluene. This procedure was repeated five hours later. After standing overnight, the residue was exposed to a vacuum to remove the excess of acetic anhydride, and 10 ml. ethanol was added to the residue.

The solution so obtained was stirred for 20 minutes at ambient temperature (about 20° C.), the ethanol was evaporated, and 50 ml. toluene was added to the residue. The mixture was concentrated in a vacuum to about 0.5 ml., and the concentrate was fractionated by thin layer chromatography on silica gel (E. Merck, TLC plates Silica Gel F$_{254}$), using chloroform as a developing solvent. The bands at R$_f$ 0.83 were extracted with ethanol, and the extract was steam distilled at a pressure sufficiently low to keep the water temperature at about 40° C. The aqueous distillate (about 1.1 liter) was extracted twice with 200 ml. ethyl acetate, and 24 mg. octa-2,3-diene-5,7-diyne-1-ol acetic acid ester (1 - acetoxy - octa-2,3-diene-5,7-diyne) was recovered after evaporation of the solvent from the combined extracts.

The compound gave a single spot on silica gel in thin layer chromatography. It tended to polymerize in the absence of solvent. It was identified by hydrogenation to n-octyl acetate in ethanol with Adams' catalyst.

UV$\lambda_{max}$ in ethanol: 235, 246, 260, and 274 m$\mu$
IR$\nu_{max}$ in carbon tetrachloride: 3309, 2950, 2198, 1954, 1746, 1375, 1225, 1048, 1030, and 856 cm.$^{-1}$.

EXAMPLE 2

2 ml. propionic anhydride and 20 ml. xylene were added to a solution of 100 mg. octa-2,3-diene-5,7-diyne-1-ol in 10 ml. chloroform, and the mixture was allowed to stand for three hours at room temperature. Most of the solvents present were distilled off in a vacuum, and 10 ml. xylene was then added and distilled off after 10 hours in a vacuum to remove residual propionic acid by azeotropic distillation. The residue was stirred for 20 minutes at room temperature with 10 ml. ethanol, most of the ethanol was distilled off, 30 ml. xylene was added to the residue, and the mixture was evaporated to about 0.5 ml. in a vacuum. The concentrate was fractionated by thin layer chromatography with chloroform as developing solvent, and the band at R$_f$ 0.85 was extracted with ethanol. The extract was steam distilled in a vacuum sufficient to keep the water temperature at about 40° C.

The distillate having a volume of about 1500 ml. was extracted twice with 200 ml. ethyl acetate, and 64 mg. octa-2,3-diene-5,7-diyne-1-ol propionic acid ester (1-propionyloxy-octa-2,3-diene-5,7-diyne) was recovered. The compound gave a single spot on silica gel in thin layer chromatography.

UV$\lambda_{max}$ in ethanol: identical with the acetate described in Example 1.
IR $\nu_{max}$ in carbon tetrachloride: 3310, 2956, 2214, 1952, 1744, 1464, 1348, 1264, 1178, 1088, and 856 cm.$^{-1}$.

The free alcohol and the esters inhibit the growth of *Aspergillus oryzae, Aspergillus niger, Moniliella tomentosa, Mucor mucedo, Neurospora crassa, Penicillium chrysogenum, Tricophyton rubrum, Alternaria kikuchii, Botrytis cinerea, Cerosporina kikuchii, Fusarium nivale, Glaeosporium kaki, Helminthosporium oryzae, Phaeoisariopsis pitis, Rhoma distractiva, Piricularia setariae, Sclerotium roefsii, Ustilago maydis, Candida rugosa, Saccharomyces cerevisiae, Bacillus subtilis, Staphylococcus aureus*, when present in minute amounts, and may thus be employed as active agents in otherwise conventional compositions for controlling the growth and propagation of microorganisms, particularly yeasts and fungi, which are known parasites.

Quite surprisingly, the esters are effective in very much smaller concentrations than the free alcohol. Small amounts of the esters and of the free alcohol were added to otherwise conventional identical culture media for the microorganisms listed in the following Table, and the media were diluted according to standard biological practice to determine the minimum concentration effective for inhibiting microbial growth. The minimum concentrations causing inhibition are listed in the following Table.

TABLE

| Microorganism | Minimum concentration (γ/ml.) | | |
|---|---|---|---|
| | Alcohol | Acetate | Propionate |
| Aspergillus niger | 00.04 | 0.0005 | 0.001 |
| Chaetomium globosum | 0.40 | 0.00175 | 0.004 |
| Moniliella tomentosa | 0.10 | 0.00175 | 0.004 |
| Penicillium chrysogenum | 0.06 | 0.0005 | 0.001 |
| Trichophyton rubrum | 0.1 | 0.00175 | 0.004 |
| Cercosporina kikuchii | 0.04 | 0.0005 | 0.0005 |
| Gloeosporium kaki | 0.10 | 0.00175 | 0.004 |
| Candida rugosa | 0.07 | 0.0007 | 0.004 |
| Saccharomyces cervisiae | 0.10 | 0.0005 | 0.001 |
| Bacillus subtilis | 0.32 | 0.01 | 0.04 |
| Staphylococcus aureus | 0.16 | 0.005 | 0.01 |

What is claimed is:
1. A compound which is the acetic acid or propionic acid ester of octa-2,3-diene-5,7-diyne-1-ol.

References Cited

Chem. Abstracts, 64:8013h.

VIVIAN GARNER, Primary Examiner

U.S. Cl. X.R.

260—632 Y; 424—311, 343